United States Patent
Rölle et al.

(10) Patent No.: US 9,317,012 B2
(45) Date of Patent: Apr. 19, 2016

(54) PHOTOINITIATORS FOR PHOTOPOLYMERS

(71) Applicant: Bayer MaterialScience AG, Leverkusen (DE)

(72) Inventors: Thomas Rölle, Leverkusen (DE); Horst Berneth, Leverkusen (DE); Friedrich-Karl Bruder, Krefeld (DE); Thomas Fäcke, Leverkusen (DE); Marc-Stephan Weiser, Leverkusen (DE); Dennis Hönel, Zülpich-Wichterich (DE)

(73) Assignee: Covestro Deutschland AG, Leverkusen (DE)

( * ) Notice: Subject to any disclaimer, the term of this patent is extended or adjusted under 35 U.S.C. 154(b) by 0 days.

(21) Appl. No.: 14/397,989

(22) PCT Filed: Apr. 29, 2013

(86) PCT No.: PCT/EP2013/058926
§ 371 (c)(1),
(2) Date: Oct. 30, 2014

(87) PCT Pub. No.: WO2013/164317
PCT Pub. Date: Nov. 7, 2013

(65) Prior Publication Data
US 2015/0118601 A1    Apr. 30, 2015

(30) Foreign Application Priority Data
May 3, 2012    (EP) .................................... 12166555

(51) Int. Cl.
*G03H 1/02* (2006.01)
*G03H 1/26* (2006.01)
(Continued)

(52) U.S. Cl.
CPC ............... *G03H 1/02* (2013.01); *G03H 1/0244* (2013.01); *G03H 1/0248* (2013.01);
(Continued)

(58) Field of Classification Search
None
See application file for complete search history.

(56) References Cited

U.S. PATENT DOCUMENTS 2,407,346 A * 9/1946 Thorold .......................... 548/402
5,250,391 A * 10/1993 Miller .......................... 430/286.1
(Continued)

FOREIGN PATENT DOCUMENTS

EP          0223587 A1    5/1987
JP      2000039716 A    2/2000
(Continued)

OTHER PUBLICATIONS

International Search Report for PCT/EP2013/058926 mailed Jun. 25, 2013.

*Primary Examiner* — Martin Angebranndt
(74) *Attorney, Agent, or Firm* — Drinker Biddle & Reath LLP

(57) ABSTRACT

The present invention relates to novel photopolymer formulation comprising a polyol component, a polyisocyanate component, a writing monomer and a photoinitiator comprising a dye of formula (I).

(I)

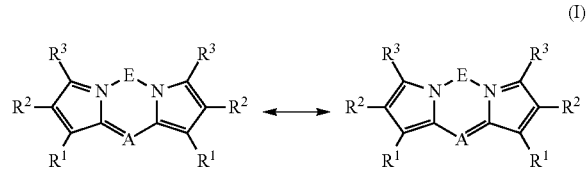

The present invention further relates to a holographic medium which contains a photopolymer formulation of the present invention or is obtainable by using same, to the use of a photopolymer formulation of the present invention for producing holographic media and also to a process for producing a holographic medium by using a photopolymer formulation of the present invention.

18 Claims, 2 Drawing Sheets

(51) Int. Cl.
*G11B 7/245* (2006.01)
*G11B 7/24* (2013.01)

(52) U.S. Cl.
CPC ............ *G03H 1/2645* (2013.01); *G11B 7/245* (2013.01); *G03H 2001/0264* (2013.01); *G03H 2260/12* (2013.01); *G11B 2007/240025* (2013.01)

(56) References Cited

U.S. PATENT DOCUMENTS

| | | | |
|---|---|---|---|
| 5,446,157 A * | 8/1995 | Morgan et al. | 546/13 |
| 5,573,909 A * | 11/1996 | Singer et al. | 435/6.11 |
| 7,052,812 B1 | 5/2006 | Wang et al. | |
| 2005/0058911 A1 * | 3/2005 | Takeyama | 430/1 |
| 2006/0194122 A1 * | 8/2006 | Takizawa | 430/1 |
| 2012/0214089 A1 * | 8/2012 | Honel et al. | 430/2 |
| 2012/0231376 A1 | 9/2012 | Rolle et al. | |
| 2013/0224634 A1 * | 8/2013 | Berneth et al. | 430/2 |

FOREIGN PATENT DOCUMENTS

| | | | |
|---|---|---|---|
| JP | 2002-169275 | * | 6/2002 |
| JP | 2005189256 A | | 7/2005 |
| WO | WO-2008/125229 A1 | | 10/2008 |
| WO | WO-2011054795 A1 | | 5/2011 |

* cited by examiner

PHOTOINITIATORS FOR PHOTOPOLYMERS

CROSS-REFERENCE TO RELATED APPLICATIONS

This application is a national stage application (under 35 U.S.C. §371) of PCT/EP2013/058926, filed Apr. 29, 2013, which claims benefit of European Application No. 12166555.8, filed May 3, 2012, both of which are incorporated herein by reference in their entirety.

The present invention relates to novel photopolymer formulation comprising a polyol component, a polyisocyanate component, a writing monomer and a photoinitiator comprising a dye of formula (I). The present invention further relates to a holographic medium which contains a photopolymer formulation of the present invention or is obtainable by using same, to the use of a photopolymer formulation of the present invention for producing holographic media and also to a process for producing a holographic medium by using a photopolymer formulation of the present invention.

Photopolymer formulations of the type mentioned at the beginning are known in the prior art. WO 2008/125229 A1, for instance, describes a photopolymer formulation comprising a polyol component, a polyisocyanate component, a writing monomer based on acrylate and also photoinitiators containing a coinitiator and a dye. In the cured state, the writing monomer and the photoinitiators form a spatially isotropic distribution embedded in the polyurethane matrix formed from polyol and polyisocyanate components.

The uses of photopolymer formulations are decisively determined by the refractive index modulation Δn produced in the photopolymer by holographic exposure. In holographic exposure, the interference field of signal light beam and reference light beam (in the simplest case, that of two plane waves) is mapped into a refractive index grating by the local photopolymerization of for example, high refractive index acrylates at loci of high intensity in the interference field. The refractive index grating in the photopolymer (the hologram) contains all the information of the signal light beam. Illuminating the hologram with only the reference light beam will then reconstruct the signal. The strength of the signal thus reconstructed relative to the strength of the incident reference light is diffraction efficiency, DE in what follows.

In the simplest case of a hologram resulting from the superposition of two plane waves, the DE is the ratio of the intensity of the light diffracted on reconstruction to the sum total of the intensities of the incident reference light and the diffracted light. The higher the DE, the greater the efficiency of a hologram with regard to the amount of reference light needed to visualize the signal with a fixed brightness.

When the hologram is illuminated with white light, for example, the width of the spectral range which can contribute to reconstructing the hologram is likewise only dependent on the layer thickness d. The relationship which holds is that the smaller the d, the greater the particular acceptance widths. Therefore, to produce bright and easily visible holograms, it is generally desirable to seek a high Δn and a low thickness d while maximizing DE. That is, increasing Δn increases the latitude to engineer the layer thickness d without loss of DE for bright holograms. Therefore, the optimization of Δn is of outstanding importance in the optimization of photopolymer formulations (P. Hariharan, Optical Holography, 2nd Edition, Cambridge University Press, 1996).

In order that a very high Δn and DE may be realized for holograms, the matrix polymers and writing monomers of a photopolymer formulation should in principle be chosen such that there is a very large difference in their refractive indices.

One possible method of realization is to use matrix polymers having a very low refractive index and writing monomers having a very high refractive index. Suitable matrix polymers of low refractive index are for example polyurethanes obtainable by reaction of a polyol component with a polyisocyanate component.

In addition to high DE and Δn values, however, another important requirement for holographic media from photopolymer formulations is that the matrix polymers be highly crosslinked in the final medium. When the degree of crosslinking is too low, the medium will lack adequate stability. One consequence of this is to appreciably reduce the quality of holograms inscribed in the media. In the worst case, the holograms may subsequently even be destroyed.

It is further very important for the large scale industrial production of holographic media from photopolymer formulations in particular that the matrix polymers crosslink quickly. Short cure times to blocking resistance are very important here, since this parameter determines the processing speed and/or the length of any curing section needed.

Components in the photopolymer formulation that have a high water imbibition capacity, for example, may lead to a distinct reduction in the degree of crosslinking, since the water reacts with the isocyanate groups present and so renders these unavailable for the crosslinking reaction. The water imbibition capacity of ionic dyes is generally significant, so there is an issue with using ionic dyes in the photopolymer formulation. Yet there is often a literature preference to using ionic dye in photopolymer formulations, since dyes of this type have a distinctly higher holographic activity.

The problem addressed by the present invention was therefore that of providing a photopolymer formulation capable of endowing the matrix polymers with an adequate degree of crosslinking within short curing times and also of providing stable holographic media for bright holograms.

Fast-curing holographic media were found to be surprisingly obtainable from photopolymer formulations that contain a dye of formula (I). The media exhibit fast and high crosslinking of matrix polymer and make it possible for bright holograms to be exposed in them.

DETAILED DESCRIPTION OF THE INVENTION

Figure 1:
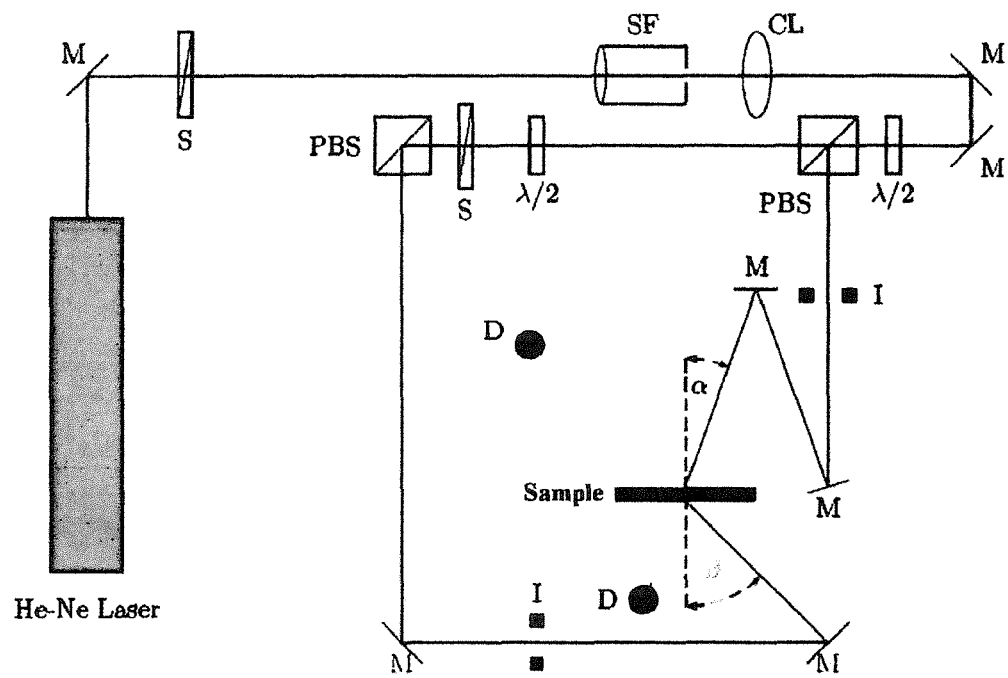
FIG. 1 shows the geometry of a holographic media tester.

The present invention accordingly provides a photopolymer formulation comprising a polyol component, a polyisocyanate component, a writing monomer and a photoinitiator, characterized in that the photoinitiator contains a dye of general formula (I),

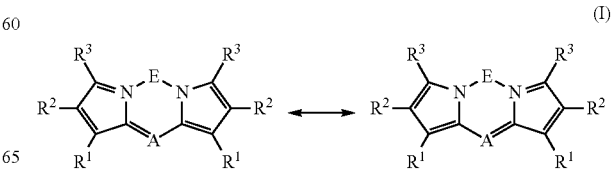

where
A represents N or C—R$^A$, where R$^A$ represents hydrogen or an optionally substituted aromatic, aliphatic or araliphatic radical,
E represents a radical derived from an element selected from boron, aluminium, gallium, indium, scandium and yttrium, and substituted with two halogen radicals or with one radical selected from oxygen and sulphur, and
R$^1$, R$^2$, R$^3$ each independently represent hydrogen, halogen, cyano, nitro, optionally fluorinated alkoxy or an optionally substituted aromatic, aliphatic or araliphatic radical.

The dyes of general formula (I) which are used according to the present invention are neutral dyes, which do not have the disadvantages of ionic dyes. It also transpired that, surprisingly, using the specific dyes of general formula (I) makes it possible to obtain photopolymer formulations into which bright holograms can be exposed in an outstanding manner. This is all the more surprising because, in the prior art, it is especially the combination of ionic dyes with oppositely charged co-initiators that are regarded as suitable photoinitiators for various applications and, what is more, a whole series of neutral dyes have no suitability whatsoever for photoinitiator systems in holographic applications. The surprise was therefore that particularly the specific dyes of general formula (I) should satisfy the requirements mentioned and make possible the production of holographically exposable photopolymers in the first place.

The dyes of general formula (I) may have various bonding scenarios in their structural formula which are representable by the following mesomeric limiting formulae:

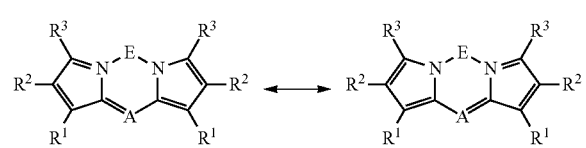

(I)

The water imbibition of the dye of formula (I) is preferably ≤5%, more preferably ≤3% and most preferably <2%. It is yet even more preferable for the dye of formula (I) to imbibe only traces of water, if any.

Water imbibition is apparent from formula (F-1)

$$W=(m_f/m_t-1)*100\%$$ (F-1), where $m_f$ is the mass of the dye after water saturation and m is the mass of the dried dye. $m_t$ is ascertained by drying a particular quantity of the dye to constant mass, for example at elevated temperature in vacuo. $m_f$ is determined by letting a particular quantity of dye stand in air at a defined humidity to constant weight.

When A represents C—R$^A$, R$^A$ preferably comprises an optionally substituted aromatic or aliphatic radical, while optionally substituted aromatic or aliphatic radicals can also be heteroaromatic or heteroaliphatic radicals.

Aliphatic radicals R$^A$ may preferably be C$_1$-C$_{20}$-alkyl radicals, more preferably C$_1$-C$_6$-alkyl radicals. C$_1$-C$_6$-Alkyl radicals represent for example methyl, ethyl, n-propyl, isopropyl, n-butyl, sec-butyl, tert-butyl, n-pentyl, 1-methylbutyl, 2-methylbutyl, 3-methylbutyl, neopentyl, 1-ethylpropyl, cyclohexyl, cyclopentyl, n-hexyl, 1,1-dimethylpropyl, 1,2-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, 1-ethyl-2-methylpropyl or 1-ethyl-2-methylpropyl, C$_1$-C$_{18}$-alkyl radicals additionally represent for example n-heptyl and n-octyl, pinacyl, adamantyl, the isomeric menthyls, n-nonyl, n-decyl, n-dodecyl, n-tridecyl, n-tetradecyl, n-hexadecyl, n-octadecyl or stearyl. Heteroaliphatic radicals R$^A$ are preferably polyether moieties, preferably long chain ethylene oxide or propylene oxide moieties having up to 8 repeat units. Esters or urethanes of 1 to 20 carbon atoms can also be used, especially those having 1 to 2 ester and/or urethane groups.

Aromatic radicals R$^A$ may further preferably be aromatic radicals having 4 to 24 scaffolding carbon atoms, in each of which no, one, two or three scaffolding carbon atoms per cycle may be replaced by heteroatoms selected from the group nitrogen, sulphur or oxygen, but preferably be for a carbocyclic aromatic radical having 6 to 24 scaffolding carbon atoms.

Examples of C$_6$-C$_{24}$-aryl radicals are phenyl, o-, p-, m-tolyl, naphthyl, phenanthrenyl, anthracenyl or fluorenyl, Examples of heteroaromatic C$_4$-C$_{24}$-aryl radicals in which none, one, two or three scaffolding carbon atoms per cycle, but at least one scaffolding carbon atom in the molecule as a whole, may be replaced by heteroatoms selected from the group nitrogen, sulphur or oxygen, are for example pyridyl, pyridyl N-oxide, pyrimidyl, pyridazinyl, pyrazinyl, thienyl, furyl, pyrrolyl, pyrazolyl, imidazolyl, thiazolyl, oxazolyl or isoxazolyl, indolizinyl, indolyl, benzo[b]thienyl, benzo[b]furyl, indazolyl, quinolyl, isoquinolyl, naphthyridinyl, quinazolinyl, benzofuranyl or dibenzofuranyl.

The dye is preferably a dye where A in general formula (I) preferably represents N.

The dye is preferably a dye where E in general formula (I) represents a substituted boron-derived radical, more preferably a halogen-disubstituted boron-derived radical.

The dye is preferably a dye where R$^1$, R$^2$ and R$^3$ in general formula (I) each independently represent hydrogen, halogen, cyano, nitro, optionally fluorinated alkoxy or an aromatic, aliphatic or araliphatic radical optionally substituted by halogen and/or N-, O- or S-containing groups, preferably each independently represent hydrogen or an optionally halogen-, hydroxy- or alkoxy-substituted aromatic, aliphatic or araliphatic radical, more preferably each independently represent hydrogen or an optionally halogen-, hydroxy- or alkoxy-substituted aromatic radical and most preferably each independently represent hydrogen or an optionally halogen-substituted aromatic radical.

The appropriately substituted aromatic radical(s) may for example and preference be aromatic radicals having 4 to 24 scaffolding carbon atoms in which none, one, two or three scaffolding carbon atoms per cycle may be replaced by heteroatoms selected from the group nitrogen, sulphur or oxygen. Preferably, however, the appropriately substituted aromatic radical(s) is or are a carbocyclic aromatic radical having 6 to 24 scaffolding carbon atoms. Examples of C$_6$-C$_{24}$-aryl radicals are phenyl, o-, p-, m-tolyl, xylene, naphthyl, phenanthrenyl, anthracenyl or fluorenyl, Examples of heteroaromatic C$_4$-C$_{24}$-aryl radicals in which none, one, two or three scaffolding carbon atoms per cycle, but at least one scaffolding carbon atom in the molecule as a whole, may be replaced by heteroatoms selected from the group nitrogen, sulphur or oxygen, are for example pyridyl, pyridyl N-oxide, pyrimidyl, pyridazinyl, pyrazinyl, thienyl, furyl, pyrrolyl, pyrazolyl, imidazolyl, thiazolyl, oxazolyl or isoxazolyl, indolizinyl, indolyl, benzo[b]thienyl, benzo[b]furyl, benzooxazolyl, benzothiazolyl, indazolyl, quinolyl, isoquinolyl, naphthyridinyl, quinazolinyl, benzofuranyl or dibenzofuranyl.

Alkoxy represents for example the alkoxy groups corresponding to the alkyl groups recited for $R^4$.

It is particularly preferable, however, for the appropriately substituted aromatic radical(s) to be phenyl. It is particularly preferable for the dye of formula (I) to be a dye of formula (I) where A represents N, E represents a substituted boron-derived radical, preferably a halogen-disubstituted boron-derived radical, and $R^1$, $R^2$ and $R^3$ each independently represent hydrogen or an optionally halogen-, hydroxy- or alkoxy-substituted aromatic, aliphatic or araliphatic radical, more preferably each independently represent hydrogen or an optionally halogen-, hydroxy- or alkoxy-substituted aromatic radical and most preferably each independently represent hydrogen or an optionally halogen-substituted aromatic radical.

Very particular preference is given to dyes of formula (I) where A represents N, E represents a halogen-disubstituted boron-derived radical, and $R^1$, $R^2$ and $R^3$ each independently represent hydrogen or an optionally halogen-, hydroxy- or alkoxy-substituted aromatic, aliphatic or araliphatic radical, more preferably each independently represent hydrogen or an optionally halogen-, hydroxy- or alkoxy-substituted aromatic radical and most preferably each independently represent hydrogen or an optionally halogen-substituted aromatic radical.

Useful halogen substituents for the boron-derived radical E include for example fluorine, chlorine, bromine or iodine substituents, preferably fluorine or chlorine substituents. Fluorine substituents are particularly preferred.

Useful halogen substituents for the aromatic radicals $R^1$, $R^2$ and $R^3$ include for example fluorine, chlorine, bromine or iodine substituents, preferably fluorine, chlorine or bromine substituents. Fluorine or bromine substituents are particularly preferred.

In preferred embodiments of the invention, general formula (I) has the $R^2$ radicals representing hydrogen and the $R^1$ and $R^3$ radicals each independently representing an optionally halogen-, hydroxy- or alkoxy-substituted, preferably optionally halogen-substituted, aromatic radical. It is preferable here for the radicals $R^1$ or $R^3$ to represent halogen-, hydroxy- or alkoxy-substituted, preferably halogen-substituted, aromatic radicals and the respectively other radicals comprising unsubstituted aromatic radicals. It is further preferable for all the $R^1$ and $R^3$ radicals to represent an unsubstituted aromatic radical.

Exemplary dyes of general formula (I) are the dyes of formulae (I-a) to (I-c)

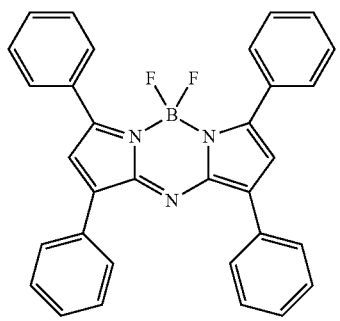

(I-a)

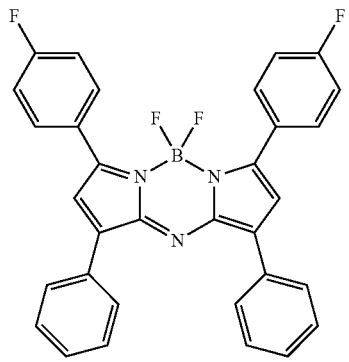

(I-b)

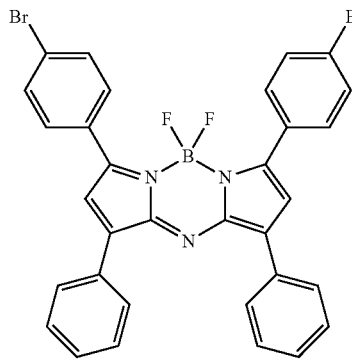

(I-c)

which, analogously to formula (I), can also represent mesomeric limiting formulae.

Using the dyes of formula (I) further enables co-solvents, especially dipolar aprotic co-solvents, such as DMSO, NMP or NEP for example, for improving the solubility of dyes in the photopolymer formulations to be dispensed with. This avoids residues in the holographic media of such co-solvents which are generally difficult to remove residuelessly. This is advantageous in that subsequently off-gassing co-solvent residues can affect the quality of exposed holograms significantly by subsequently occurring shrinkage and hence change to the lattice spaces of written holograms, or can have an adverse effect on adhering properties.

It can therefore be advantageous and preferable to use a photopolymer formulation which is of the present invention and is free from co-solvents.

Suitable photoinitiators are typically compounds which are activatable by actinic radiation and capable of inducing a polymerization of corresponding groups. Photoinitiators can be distinguished into unimolecular initiators (type I) and bimolecular initiators (type II). They are further distinguished according to their chemical character into photoinitiators for free-radical, anionic, cationic or mixed type of polymerization; the prior art is broad in this regard.

Type I photoinitiators (Norrish type I) for free-radical photopolymerization form free radicals on irradiation by unimolecular bond cleavage.

Examples of type I photoinitiators are triazines, for example tris(trichloromethyl)triazine, oximes, benzoin ethers, benzil ketals, alpha-alpha-dialkoxyacetophenone, phenylglyoxylic esters, bisimidazoles, aroylphosphine oxides, e.g. 2,4,6-trimethylbenzoyldiphenylphosphine oxide, sulphonium and iodonium salts.

Type II photoinitiators (Norrish type II) for free-radical polymerization undergo a bimolecular reaction on irradiation wherein the photoinitiator reacts in the excited state with a second molecule, the coinitiator, and forms the polymerization-inducing free radicals by electron or proton transfer or direct hydrogen abstraction.

Examples of type II photoinitiators are quinones, for example camphorquinone, aromatic keto compounds, for example benzophenones combined with tertiary amines, alkylbenzophenones, halogenated benzophenones, 4,4'-bis(dimethylamino)benzophenone (Michler's ketone), anthrone, methyl p-(dimethylamino)benzoate, thioxanthone, ketocoumarins, alpha-aminoalkylphenone, alpha-hydroxyalkylphenone and cationic dyes, for example methylene blue, combined with tertiary amines.

Type I and type II photoinitiators are used for the UV and short-wave visible region, while predominantly type II photoinitiators are used for the comparatively long-wave visible spectrum.

The photoinitiator systems described in EP 0 223 587 A, consisting of a mixture of an ammonium alkyl arylborate and one or more dyes are also useful as type II photoinitiator for free-radical polymerization. Examples of suitable ammonium alkyl arylborates are tetrabutylammonium triphenylhexylborate, tetrabutylammonium triphenylbutylborate, tetrabutylammonium trinaphthylhexylborate, tetrabutylammonium tris(4-tert-butyl)phenylbutylborate, tetrabutylammonium tris(3-fluorophenyl)hexylborate, tetramethylammonium triphenylbenzylborate, tetra(n-hexyl)ammonium (sec-butyl)triphenylborate, 1-methyl-3-octylimidazolium dipentyldiphenylborate and tetrabutylammonium tris(3-chloro-4-methylphenyl)hexylborate (Cunningham et al., RadTech'98 North America UV/EB Conference Proceedings, Chicago, Apr. 19-22, 1998).

The photoinitiators used for anionic polymerization are generally type I systems and derive from transition metal complexes of the first row. Examples which may be mentioned here are chromium salts, for example trans-$Cr(NH_3)_2(NCS)_4^-$ (Kutal et al, Macromolecules 1991, 24, 6872) or ferrocenyl compounds (Yamaguchi et alt Macromolecules 2000, 33, 1152).

A further option for anionic polymerization is to use dyes, such as crystal violet leuconitrile or malachite green leuconitrile, which are capable of polymerizing cyanoacrylates through photolytic decomposition (Neckers et al. Macromolecules 2000, 33, 7761). The chromophore becomes incorporated in the resulting polymers, making these intrinsically coloured.

Photoinitiators useful for cationic polymerization consist essentially of three classes: aryldiazonium salts, onium salts (here specifically: iodonium, sulphonium and selenonium salts) and also organometallic compounds. Phenyldiazonium salts are capable on irradiation of producing, not only in the presence but also in the absence of a hydrogen donor, a cation which initiates the polymerization. The efficiency of the overall system is determined by the nature of the counterion used to the diazonium compound. Preference is given to the little-reactive but fairly costly $SbF_6^-$, $AsF_6^-$ or $PF_6^-$. These compounds are generally less suitable for use in coating thin films, since the nitrogen released following exposure reduces surface quality (pinholes) (Li et al., Polymeric Materials Science and Engineering, 2001, 84, 139).

Onium salts, specifically sulphonium and iodonium salts, are very widely used and also commercially available in a wide variety of forms. The photochemistry of these compounds has been the subject of sustained investigation. Iodonium salts on excitation initially disintegrate homolytically and thereby produce one free radical and one free-radical cation which transitions by hydrogen abstraction into a cation which finally releases a proton and thereby initiates cationic polymerization (Dektar et al. J. Org. Chem. 1990, 55, 639; J. Org. Chem., 1991, 56. 1838). This mechanism makes it possible for iodonium salts to likewise be used for free-radical photopolymerization. The choice of counterion is again very important here. Preference is likewise given to using $SbF_6^-$, $AsF_6^-$ or $PF_6^-$. This structural class is in other respects fairly free as regards the choice of substitution on the aromatic, being essentially determined by the availability of suitable synthons. Sulphonium salts are compounds that decompose by the Norrish type II mechanism (Crivello et al., Macromolecules, 2000, 33, 825). The choice of counterion is also critically important in sulphonium salts because it is substantially reflected in the curing rate of the polymers. The best results are generally achieved in $SbF_6^-$ salts.

Since the intrinsic absorption of iodonium and sulphonium salts is <300 nm, these compounds should be appropriately sensitized for a photopolymerization with near UV or short-wave visible light. This is accomplished by using aromatics that absorb at longer wavelengths, for example anthracene and derivatives (Gu et al., Am. Chem. Soc. Polymer Preprints, 2000, 41 (2), 1266) or phenothiazine and/or derivatives thereof (Hua et al, Macromolecules 2001, 34, 2488-2494).

It can be advantageous to use mixtures of these sensitizers or else photoinitiators. Depending on the radiation source used, photoinitiator type and concentration has to be adapted in a manner known to a person skilled in the art. Further particulars are described for example in P. K. T. Oldring (Ed.), Chemistry & Technology of UV & EB Formulations For Coatings, inks & Paints, Vol. 3, 1991, SITA Technology, London, pp. 61-328.

Preferred photoinitiators are mixtures of tetrabutylammonium tetrahexylborate, tetrabutylammonium triphenylhexylborate, tetrabutylammonium triphenylbutylborate, tetrabutylammonium tris(3-fluorophenyl)hexylborate ([191726-69-9], CGI 7460, product from BASF SE, Basle, Switzerland) and tetrabutylammonium tris(3-chloro-4-methylphenyl)hexylborate ([1147315-11-4], CGI 909, product from BASF SE, Basle, Switzerland) with dyes of formula (I).

As polyisocyanate component a) there can be used any compounds well known per se to a person skilled in the art, or mixtures thereof, which on average contain two or more NCO functions per molecule. These can be aromatic, araliphatic, aliphatic or cycloaliphatic based. Monoisocyanates and/or unsaturation-containing polyisocyanates can also be used, in minor amounts.

Suitable examples are butylene diisocyanate, hexamethylene diisocyanate (HDI), isophorone diisocyanate (IPDI), 1,8-diisocyanato-4-(isocyanatomethyl)octane, 2,2,4- and/or 2,4,4-trimethylhexamethylene diisocyanate, the isomeric bis(4,4'-isocyanatocyclohexyl)methane and mixtures thereof having any desired isomer content, isocyanatomethyl-1,8-octane diisocyanate, 1,4-cyclohexylene diisocyanate, the isomeric cyclohexanedimethylene diisocyanates, 1,4-phenylene diisocyanate, 2,4- and/or 2,6-tolylene diisocyanate, 1,5-naphthylene diisocyanate, 2,4'- or 4,4'-diphenylmethane diisocyanate and/or triphenylmethane 4,4',4"-triisocyanate.

It is likewise possible to use derivatives of monomeric di- or triisocyanates having urethane, urea, carbodiimide, acylurea, isocyanurate, allophanate, biuret, oxadiazinetrione, uretdione and/or iminooxadiazinedione structures.

Preference is given to using polyisocyanates based on aliphatic and/or cycloaliphatic di- or triisocyanates.

It is particularly preferable for the polyisocyanates of component a) to comprise di- or oligomerized aliphatic and/or cycloaliphatic di- or triisocyanates.

Very particular preference is given to isocyanurates, uretdiones and/or iminooxadiazinediones based on HDI, 1,8-diisocyanato-4-(isocyanatomethyl)octane or mixtures thereof.

Likewise useful as component a) are NCO-functional prepolymers having urethane, allophanate, biuret and/or amide groups. Prepolymers of component a) are obtained in a well-known conventional manner by reacting monomeric, oligomeric or polyisocyanates a1) with isocyanate-reactive compounds a2) in suitable stoichiometry in the presence or absence of catalysts and solvents.

Useful polyisocyanates a1) include all aliphatic, cycloaliphatic, aromatic or araliphatic di- and triisocyanates known per se to a person skilled in the art, it being immaterial whether they were obtained by phosgenation or by phosgene-free processes. In addition, it is also possible to use the well-known conventional higher molecular weight descendant products of monomeric di- and/or triisocyanates having a urethane, urea, carbodiimide, acylurea, isocyanurate, allophanate, biuret, oxadiazinetrione, uretdione or iminooxadiazinedione structure each individually or in any desired mixtures among each other.

Examples of suitable monomeric di- or triisocyanates useful as component a1) are butylene diisocyanate, hexamethylene diisocyanate (HDI), isophorone diisocyanate (IPDI), trimethylhexamethylene diisocyanate (TMDI), 1,8-diisocyanato-4-(isocyanatomethyl)octane, isocyanatomethyl-1,8-octane diisocyanate (TIN), 2.4- and/or 2,6-toluene diisocyanate.

The isocyanate-reactive compounds a2) for constructing the prepolymers are preferably OH-functional compounds. These are analogous to the OH-functional compounds described hereinbelow for component b).

The use of amines for prepolymer preparation is also possible. For example, ethylenediamine, diethylenetriamine, triethylenetetramine, propylenediamine, diaminocyclohexane, diaminobenzene, diaminobisphenyl, difunctional polyamines, such as, for example, the Jeffamine® amine-terminated polymers having number average molar masses of up to 10 000 g/mol and any desired mixtures thereof with one another are suitable.

For the preparation of prepolymers containing biuret groups, isocyanate is reacted in excess with amine, a biuret group forming. All oligomeric or polymeric, primary or secondary, difunctional amines of the abovementioned type are suitable as amines in this case for the reaction with the di-, tri- and polyisocyanates mentioned.

Preferred prepolymers are urethanes, allophanates or biurets obtained from aliphatic isocyanate-functional compounds and oligomeric or polymeric isocyanate-reactive compounds having number average molar masses of 200 to 10 000 g mol; particular preference is given to urethanes, allophanates or biurets obtained from aliphatic isocyanate-functional compounds and oligomeric or polymeric polyols or polyamines having number average molar masses of 500 to 8500 g/mol. Very particular preference is given to allophanates formed from HIDI or TMDI and difunctional polyether-polyols having number average molar masses of 1000 to 8200 g/mol.

The prepolymers described above preferably have residual contents of free monomeric isocyanate of less than 1 wt %, particularly preferably less than 0.5 wt %, very particularly preferably less than 0.2 wt %.

In addition to the prepolymers described, the polyisocyanate component can of course contain further isocyanate components proportionately. Aromatic, araliphatic, aliphatic and cycloaliphatic di-, tri- or polyisocyanates are suitable for this purpose. It is also possible to use mixtures of such di-, tri- or polyisocyanates. Examples of suitable di-, tri- or polyisocyanates are butylene diisocyanate, hexamethylene diisocyanate (HDL), isophorone diisocyanate (IPDI), 1,8-diisocyanato-4-(isocyanatomethyl)octane, 2,2,4- and/or 2,4,4-trimethylhexamethylene diisocyanate (TMDI), the isomeric bis(4,4'-isocyanatocyclohexyl)methanes and mixtures thereof having any desired isomer content, isocyanatomethyl-1,8-octane diisocyanate, 1,4-cyclohexylene diisocyanate, the isomeric cyclohexanedimethylene diisocyanates, 1,4-phenylene diisocyanate, 2,4- and/or 2,6-tolylene diisocyanate, 1,5-naphthylene diisocyanate, 2,4'- or 4,4'-diphenylmethane diisocyanate, triphenylmethane 4,4',4''-triisocyanate or derivatives thereof having a urethane, urea, carbodiimide, acylurea, isocyanurate, allophanate, biuret, oxadiazinetrione, uretdione or iminooxadiazinedione structure and mixtures thereof. Polyisocyanates based on oligomerized and/or derivatized diisocyanates which were freed from excess diisocyanate by suitable processes are preferred, in particular those of hexamethylene diisocyanate. The oligomeric isocyanurates, uretdiones and iminooxadiazinediones of HDI and mixtures thereof are particularly preferred.

It is optionally also possible for the polyisocyanate component a) proportionately to contain isocyanates, which are partially reacted with isocyanate-reactive ethylenically unsaturated compounds. $\alpha,\beta$-Unsaturated carboxylic acid derivatives, such as acrylates, methacrylates, maleates, fumarates, maleimides, acrylamides, and vinyl ethers, propenyl ethers, allyl ethers and compounds which contain dicyclopentadienyl units and have at least one group reactive towards isocyanates are preferably used here as isocyanate-reactive ethylenically unsaturated compounds; these are particularly preferably acrylates and methacrylates having at least one isocyanate-reactive group. Suitable hydroxy-functional acrylates or methacrylates are, for example, compounds such as 2-hydroxyethyl(meth)acrylate, polyethylene oxide mono(meth)acrylates, polypropylene oxide mono(meth)acrylates, polyalkylene oxide mono(meth)acrylates, poly($\epsilon$-caprolactone)mono(meth)acrylates, such as, for example, Tone® M100 (Dow, USA), 2-hydroxypropyl(meth)acrylate, 4-hydroxybutyl(meth)acrylate, 3-hydroxy-2,2-dimethylpropyl(meth)acrylate, the hydroxy-functional mono-, di- or tetra (meth)acrylates of polyhydric alcohols, such as trimethylolpropane, glycerol, pentaerythritol, dipentaerythritol, ethoxylated, propoxylated or alkoxylated trimethylolpropane, glycerol, pentaerythritol, dipentaerythritol and industrial mixtures thereof. In addition, isocyanate-reactive oligomeric or polymeric unsaturated compounds containing acrylate and/or methacrylate groups, alone or in combination with the abovementioned monomeric compounds, are suitable. The proportion of isocyanates which are partly reacted with isocyanate-reactive ethylenically unsaturated compounds, based on the isocyanate component a), is 0 to 99%, preferably 0 to 50%, particularly preferably 0 to 25% and very particularly preferably 0 to 15%.

It may also be possible for the abovementioned polyisocyanate component a) to contain, completely or proportionately, isocyanates which are reacted completely or partially with blocking agents known to the person skilled in the art from coating technology. The following may be mentioned as an example of blocking agents: alcohols, lactams, oximes, malonic esters, alkyl acetoacetates, triazoles, phenols, imidazoles, pyrazoles and amines, such as, for example, butanone oxime, diisopropylamine, 1,2,4-triazole, dimethyl-1,2,4-triazole, imidazole, diethyl malonate, ethyl acetoacetate, acetone oxime, 3,5-dimethylpyrazole, c-caprolactam, N-tert-butylbenzylamine, cyclopentanone carboxyethyl ester or any desired mixtures of these blocking agents.

It is particularly preferable for the polyisocyanate component to be an aliphatic polyisocyanate or an aliphatic prepolymer and preferably an aliphatic polyisocyanate or a prepolymer with primary NCO groups.

All polyfunctional, isocyanate-reactive compounds which have on average at least 1.5 isocyanate-reactive groups per molecule can be used as polyol component b).

In the context of the present invention, isocyanate-reactive groups are preferably hydroxyl, amino or thio groups, and hydroxy compounds are particularly preferred.

Suitable polyfunctional, isocyanate-reactive compounds are, for example, polyester-, polyether-, polycarbonate-, poly(meth)acrylate- and/or polyurethanepolyols.

Suitable polyesterpolyols are, for example, linear polyesterdiols or branched polyesterpolyols, as are obtained in a known manner from aliphatic, cycloaliphatic or aromatic di- or polycarboxylic acids or their anhydrides with polyhydric alcohols having an OH functionality of ≥2.

Examples of such di- or polycarboxylic acids or anhydrides are succinic, glutaric, adipic, pimelic, suberic, azelaic, sebacic, nonanedicarboxylic, decanedicarboxylic, terephthalic, isophthalic, o-phthalic, tetrahydrophthalic, hexahydrophthalic or trimellitic acid and acid anhydrides, such as o-phthalic, trimellitic or succinic anhydride or any desired mixtures thereof with one another.

Examples of suitable alcohols are ethanediol, di-, tri- or tetraethylene glycol, 1,2-propanediol, di-, tri- or tetrapropylene glycol, 1,3-propanediol, 1,4-butanediol, 1,3-butanediol, 2,3-butanediol, 1,5-pentanediol, 1,6-hexanediol, 2,2-dimethyl-1,3-propanediol, 1,4-dihydroxycyclohexane, 1,4-dimethylolcyclohexane, 1,8-octanediol, 1,10-decanediol, 1,12-dodecanediol, trimethylolpropane, glycerol or any desired mixtures thereof with one another.

The polyesterpolyols may also be based on natural raw materials, such as castor oil. It is also possible for the polyesterpolyols to be based on homo- or copolymers of lactones, as can preferably be obtained by an addition reaction of lactones or lactone mixtures, such as butyrolactone, ε-caprolactone and/or methyl-ε-caprolactone, with hydroxy-functional compounds, such as polyhydric alcohols having an OH functionality of ≥2 for example of the aforementioned type.

Such polyesterpolyols preferably have number average molar masses of 400 to 4000 g/mol, particularly preferably of 500 to 2000 g/mol. Their OH functionality is preferably 1.5 to 3.5, particularly preferably 1.8 to 3.0.

Suitable polycarbonatepolyols are obtainable in a manner known per se by reacting organic carbonates or phosgene with diols or diol mixtures.

Suitable organic carbonates are dimethyl, diethyl and diphenyl carbonate.

Suitable diols or mixtures comprise the polyhydric alcohols mentioned in connection with the polyester segments and having an OH functionality of 2, preferably 1,4-butanediol, 1,6-hexanediol and/or 3-methylpentanediol, or polyesterpolyols can be converted into polycarbonatepolyols.

Such polycarbonatepolyols preferably have number average molar masses of 400 to 4000 g/mol, particularly preferably of 500 to 2000 g/mol. The OH functionality of these polyols is preferably 1.8 to 3.2, particularly preferably 1.9 to 3.0.

Suitable polyetherpolyols are polyadducts of cyclic ethers with OH- or NH-functional starter molecules, said polyadducts optionally having a block structure.

Suitable cyclic ethers are, for example, styrene oxides, ethylene oxide, propylene oxide, tetrahydrofuran, butylene oxide, epichlorohydrin and any desired mixtures thereof, Starters which may be used are the polyhydric alcohols mentioned in connection with the polyesterpolyols and having an OH functionality of ≥2 and primary or secondary amines and amino alcohols.

Preferred polyetherpolyols are those of the abovementioned type, exclusively based on propylene oxide or random or block copolymers based on propylene oxide with further 1-alkylene oxides, the proportion of 1-alkylene oxides being not higher than 80 wt %. Propylene oxide homopolymers and random or block copolymers which have oxyethylene, oxypropylene and/or oxybutylene units are particularly preferred, the proportion of the oxypropylene units, based on the total amount of all oxyethylene, oxypropylene and oxybutylene units, accounting for at least 20 wt %, preferably at least 45 wt %. Here, oxypropylene and oxybutylene comprise all respective linear and branched C3- and C4-isomers.

Such polyetherpolyols preferably have number average molar masses of 250 to 10 000 g/mol, particularly preferably of 500 to 8500 g/mol and very particularly preferably of 600 to 4500 g/mol. The OH functionality is preferably 1.5 to 4.0, particularly preferably 1.8 to 3.1.

Suitable constituents for polyol component b) comprising polyfunctional, isocyanate-reactive compounds also include aliphatic, araliphatic or cycloaliphatic di-, tri- or polyfunctional alcohols of low molecular weight, i.e. with molecular weights below 500 g/mol, which are short chain, i.e. contain from 2 to 20 carbon atoms.

These may be for example ethylene glycol, diethylene glycol, triethylene glycol, tetraethylene glycol, dipropylene glycol, tripropylene glycol, 1,2-propanediol, 1,3-propanediol, 1,4-butanediol, neopentylglycol, 2-ethyl-2-butylpropanediol, trimethylpentanediol, positionally isomeric diethyloctanediols, 1,3-butylene glycol, cyclohexanediol, 1,4-cyclohexanedimethanol, 1,6-hexanediol, 1,2-cyclohexanediol, 1,4-cyclohexanediol, hydrogenated bisphenol A, (2,2-bis(4-hydroxy-cyclohexyl)propane), 2,2-dimethyl-3-hydroxypropyl 2,2-dimethyl-3-hydroxypropionate. Examples of suitable triols are trimethylolethane, trimethylolpropane or glycerol. Suitable polyfunctional alcohols are ditrimethylolpropane, pentaerythritol, dipentaerythritol or sorbitol.

It is particularly preferable for the polyol component to be a difunctional polyether, polyester or a polyether-polyester block copolyester or a polyether-polyester block copolymer with primary OH functions.

In a further preferred embodiment, the writing monomer comprises one or more than one monofunctional and/or multifunctional writing monomer, which may be especially mono- and multifunctional acrylate writing monomers. It is particularly preferable for the writing monomer to comprise at least a monofunctional and a multifunctional urethane (meth)acrylate.

Acrylate writing monomers may be more particularly compounds of general formula (II)

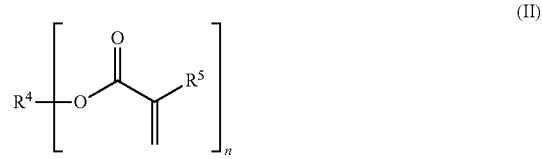

where in each case n is ≥1 and n≤4 and $R^4$, $R^5$ are independently of each other hydrogen, linear, branched, cyclic or heterocyclic unsubstituted or else optionally heteroatom-substituted organic radicals. It is particularly preferable for R to be hydrogen or methyl and/or $R^4$ to be a linear, branched, cyclic or heterocyclic unsubstituted or else optionally heteroatom-substituted organic radical.

It is similarly possible to add further unsaturated compounds such as α,β-unsaturated carboxylic acid derivatives such as acrylates, methacrylates, maleates, fumarates, maleimides, acrylamides, also vinyl ether, propenyl ether, allyl ether and dicyclopentadienyl-containing compounds and also olefinically unsaturated compounds such as, for example, styrene, α-methylstyrene, vinyltoluene, olefins, for example 1-octene and/or 1-decene, vinyl esters, (meth)acrylonitrile, (meth)acrylamide, methacrylic acid, acrylic acid. Preference, however, is given to acrylates and methacrylates.

In general, esters of acrylic acid and methacrylic acid are designated as acrylates and methacrylates, respectively. Examples of acrylates and methacrylates which can be used are methyl acrylate, methyl methacrylate, ethyl acrylate, ethyl methacrylate, ethoxyethyl acrylate, ethoxyethyl methacrylate, n-butyl acrylate, n-butyl methacrylate, tert-butyl acrylate, tert-butyl methacrylate, hexyl acrylate, hexyl methacrylate, 2-ethylhexyl acrylate, 2-ethylhexyl methacrylate, butoxyethyl acrylate, butoxyethyl methacrylate, lauryl acrylate, lauryl methacrylate, isobornyl acrylate, isobornyl methacrylate, phenyl acrylate, phenyl methacrylate, p-chlorophenyl acrylate, p-chlorophenyl methacrylate, p-bromophenyl acrylate, p-bromophenyl methacrylate, 2,4,6-trichlorophenyl acrylate, 2,4,6-trichlorophenyl methacrylate, 2,4,6-tribromophenyl acrylate, 2,4,6-tribromophenyl methacrylate, pentachlorophenyl acrylate, pentachlorophenyl methacrylate, pentabromophenyl acrylate, pentabromophenyl methacrylate, pentabromobenzyl acrylate, pentabromobenzyl methacrylate, phenoxyethyl acrylate, phenoxyethyl methacrylate, phenoxyethoxyethyl acrylate, phenoethoxyethyl methacrylate, phenylthioethyl acrylate, phenylthioethyl methacrylate, 2-naphthyl acrylate, 2-naphthyl methacrylate, 1,4-bis(2-thionaphthyl)-2-butyl acrylate, 1,4-bis(2-thionaphthyl)-2-butyl methacrylate, propane-2,2-diylbis[(2,6-dibromo-4,1-phenylene)oxy(2-{[3,3,3-tris(4-chlorophenyl)propanoyl]oxy}propane-3,1-diyl)oxyethane-2,1-diyl]diacrylate, bisphenol A diacrylate, bisphenol A dimethacrylate, tetrabromobisphenol A diacrylate, tetrabromobisphenol A dimethacrylate and the ethoxylated analogue compounds thereof, N-carbazolyl acrylates, to mention only a selection of acrylates and methacrylates which may be used.

It will be appreciated that further urethane acrylates can also be used, Urethane acrylates are understood as meaning compounds having at least one acrylic acid ester group which additionally have at least one urethane bond. It is known that such compounds can be obtained by reacting a hydroxy-functional acrylic acid ester with an isocyanate-functional compound.

Examples of isocyanate-functional compounds which can be used for this purpose are aromatic, araliphatic, aliphatic and cycloaliphatic di-, tri- or polyisocyanates. It is also possible to use mixtures of such di-, tri- or polyisocyanates. Examples of suitable di-, tri- or polyisocyanates are butylene diisocyanate, hexamethylene diisocyanate (HDI), isophorone diisocyanate (IPDI), 1,8-diisocyanato-4-(isocyanatomethyl)octane, 2,2,4- and/or 2,4,4-trimethylhexamethylene diisocyanate, the isomeric bis(4,4'-isocyanatocyclohexyl)methanes and mixtures thereof having any desired isomer content, isocyanatomethyl-1,8-octane diisocyanate, 1,4-cyclohexylene diisocyanate, the isomeric cyclohexanedimethylene diisocyanates, 1,4-phenylene diisocyanate, 2,4- and/or 2,6-tolylene diisocyanate, 1,5-naphthylene diisocyanate, 2,4'- or 4,4'-diphenylmethane diisocyanate, 1,5-naphthylene diisocyanate, m-methylthiophenyl isocyanate, triphenylmethane 4,4', 4"-triisocyanate and tris(p-isocyanatophenyl)thiophosphate or derivatives thereof having a urethane, urea, carbodiimide, acylurea, isocyanurate, allophanate, biuret, oxadiazinetrione, uretdione or iminooxadiazinedione structure and mixtures thereof. Aromatic or araliphatic di-, tri- or polyisocyanates are preferred.

Suitable hydroxy-functional acrylates or methacrylates for the preparation of urethane acrylates are compounds such as 2-hydroxyethyl(meth)acrylate, polyethylene oxide mono (meth)acrylates, polypropylene oxide mono(meth)acrylates, polyalkylene oxide mono(meth)acrylates, poly(ε-caprolactone)mono(meth)acrylates, such as, for example, Tone® M100 (Dow, Schwalbach, Germany), 2-hydroxypropyl (meth)acrylate, 4-hydroxybutyl(meth)acrylate, 3-hydroxy-2,2-dimethylpropyl(meth)acrylate, hydroxypropyl(meth)acrylate, 2-hydroxy-3-phenoxypropyl acrylate, the hydroxy-functional mono-, di- or tetraacrylates of polyhydric alcohols, such as trimethylolpropane, glycerol, pentaerythritol, dipentaerythritol, ethoxylated, propoxylated or alkoxylated trimethylolpropane, glycerol, pentaerythritol, dipentaerythritol or industrial mixtures thereof 2-Hydroxyethyl acrylate, hydroxypropyl acrylate, 4-hydroxybutyl acrylate and poly(ε-caprolactone)mono(meth)acrylates are preferred. In addition, isocyanate-reactive oligomeric or polymeric unsaturated compounds containing acrylate and/or methacrylate groups, alone or in combination with the abovementioned monomeric compounds, are suitable. The epoxy(meth)acrylates known per se containing hydroxyl groups and having OH contents of 20 to 300 mg KOH/g or polyurethane(meth)acrylates containing hydroxyl groups and having OH contents of 20 to 300 mg KOH/g or acrylated polyacrylates having OH contents of 20 to 300 mg KOH/g and mixtures thereof with one another and mixtures with unsaturated polyesters containing hydroxyl groups and mixtures with polyester(meth)acrylates or mixtures of unsaturated polyesters containing hydroxyl groups with polyester(meth)acrylates can likewise be used. Preference is given particularly to urethane acrylates obtainable from the reaction of tris(p-isocyanatophenyl)thiophosphate and m-methylthiophenyl isocyanate with alcohol-functional acrylates such as hydroxyethyl (meth)acrylate, hydroxypropyl(meth)acrylate and hydroxybutyl(meth)acrylate.

Particular preference is given to a combination of components a) and b) in the production of matrix polymers consisting of addition products of butyrolactone, e-caprolactone and/or methyl-a-caprolactone onto polyetherpolyols having a functionality of 1.8 to 3.1 with number-average molar masses of 200 to 4000 g/mol in conjunction with isocyanurates, uretdiones, iminooxadiazinediones and/or other oligomers based on HDI. Very particular preference is given to addition products of e-caprolactone onto poly(tetrahydrofuran)s having a functionality of 1.9 to 2.2 and number-average molar masses of 500 to 2000 g/mol (especially 600 to 1400 g/mol), the number-average total molar mass of which is in the range from 800 to 4500 g/mol, especially from 1000 to 3000 g/mol, in conjunction with oligomers, isocyanurates and/or iminooxadiazinediones based on HDI.

In a further preferred embodiment, the photopolymer formulation additionally contains urethanes as plasticizers, which urethanes may be more particularly substituted with at least a fluorine atom.

The urethanes may preferably have the general formula (III)

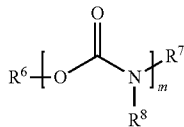

(III)

where m is ≥1 and ≤8 and $R^6$, $R^7$, $R^8$ are independently hydrogen, linear, branched, cyclic or heterocyclic unsubstituted or optionally heteroatom-substituted organic radicals, wherein preferably at least one of $R^6$, $R^7$, $R^8$ is substituted with at least a fluorine atom and more preferably $R^6$ is an organic radical comprising at least one fluorine atom. It is particularly preferable for $R^7$ to be a linear, branched, cyclic or heterocyclic organic radical which is unsubstituted or optionally substituted even with heteroatoms such as fluorine for example.

The invention also provides a holographic medium containing a photopolymer formulation of the present invention or obtainable by using a photopolymer formulation of the present invention. The invention still further provides for the use of a photopolymer formulation of the present invention for producing holographic media.

The holographic media of the present invention can be processed into holograms through appropriate exposure operations for optical applications in the entire visible and near UV range (300-800 nm). Visual holograms include all holograms recordable by processes known to a person skilled in the art. These include inter alia in-line (Gabor) holograms, off-axis holograms, full-aperture transfer holograms, white light transmission holograms ("rainbow holograms"), Denisyuk holograms, off-axis reflection holograms, edge-lit holograms and also holographic stereograms. Preference is given to reflection holograms, Denisyuk holograms, transmission holograms.

Possible optical functions of holograms obtainable using the photopolymer formulations of the present invention correspond to the optical functions of optical elements such as lenses, mirrors, deflectors, filters, scattering disks, diffraction elements, diffusors, optical fibres, waveguides, projection disks and/or masks. Combinations of this optical functions can likewise each independently be combined in one hologram. These optical elements frequently exhibit a frequency selectivity according to how the holograms were exposed and what the dimensions of the hologram are.

In addition, the photopolymer formulations of the present invention can also be used to produce holographic images or representations, for example for personal portraits, biometric representations in security documents, or generally images or image structures for advertising, security tags, brand protection, branding, labels, design elements, decorations, illustrations, collectable cards, images and the like and also images capable of representing digital data, inter alia in combination with the aforementioned products. Holographic images can have the impression of a three-dimensional image, but they can also show image sequences, short films or a number of different objects, depending on the angle from which they are illuminated, the light source with which they are illuminated (including moving ones), etc. Owing to these various possible designs, holograms, especially volume holograms, are an attractive technical solution for the abovementioned application.

The present invention accordingly further provides for the use of a holographic medium of the present invention for recording in-line, off-axis, full-aperture transfer, white light transmissions, Denisyuk, off-axis reflection or edge-lit holograms and also holographic stereograms, particularly for production of optical elements, images or image presentations.

The present invention further also provides a process for producing a holographic medium by using a photopolymer formulation of the present invention.

The photopolymer formulations can be used in the form of a film for producing holographic media in particular. As carrier, a ply of a material, or of an ensemble of materials, which is transparent to light in the visible spectrum (transmission greater than 85% in the wavelength range from 400 to 780 nm) is coated on one or both of its sides and optionally a covering layer is applied to the photopolymer ply or plies.

Preferred materials or ensembles of materials for the carrier are based on polycarbonate (PC), polyethylene terephthalate (PET), polybutylene terephthalate, polyethylene, polypropylene, cellulose acetate, cellulose hydrate, cellulose nitrate, cycloolefin polymers, polystyrene, polyepoxides, polysulphone, cellulose triacetate (CTA), polyamide, polymethyl methacrylate, polyvinyl chloride, polyvinyl butyral or polydicyclopentadiene or mixtures thereof. They are more preferably based on PC, PET and CTA. Ensembles of materials can be foil laminates or coextrudates. Preferred ensembles of materials are duplex and triplex foils constructed according to one of the schemes A/B, A/B/A or A/B/C. Particular preference is given to PC/PET, PET/PC/PET and PC/TPU (TPU=thermoplastic polyurethane).

As an alternative to the aforementioned plastic carriers, planar glass plates can also be used, especially for large-area accurately imaging exposures, for example for holographic lithography (Holografic interference lithography for integrated optics. IEEE Transactions on Electron Devices (1978), ED-25(10), 1193-1200, ISSN:0018-9383).

The materials or ensembles of materials for the carrier may have an anti-stick, antistatic, hydrophobic or hydrophilic finish on one or both sides. On the side facing the photopolymer layer, the modifications mentioned serve the purpose of making it possible to remove the photopolymer ply from the carrier non-destructively. A modification of that side of the carrier which faces away from the photopolymer ply serves to ensure that the media of the present invention meet specific mechanical requirements, for example in relation to processing in roll laminators, more particularly in roll-to-roll processes.

The examples which follow serve to elucidate the invention by way of example and are not to be construed as restricting.

EXAMPLES

Methods of Measurement

The reported OH numbers were determined according to DIN 53240-2.

The reported NCO values (isocyanate contents) were determined according to DIN EN ISO 11909, Water imbibition of examples was determined by initially drying 5-10 g of the dyes in each case in an open glass dish at a pressure of 200 mbar and a temperature of 50° C. to constant mass. Samples were weighed after removal from the vacuum drying cabinet after they had a chance to cool down to room temperature during 60 min in the absence of moisture. To ensure absence of moisture prior to weighing, the glass dishes were sealed airtight with Parafilm M® (Pechiney Plastic Packaging, Chicago, Ill. 60631, USA, www.parafilm.com), and then weighed. This was followed by standing in air at room temperature (22° C.) and relative humidity of 90% for 7 days to constant mass and weighing. Water imbibition was then computed from formula (F-1)

$$W = (m_f/m_t - 1) * 100\% \qquad (F\text{-}1),$$

where $m_f$ is the mass of the dye after water saturation and $m_t$ is the mass of the dried dye.

Measuring the holographic properties DE and $\Delta n$ of holographic media via two-beam interference in reflection arrangement.

The experimental holographic set-up as depicted in FIG. 1 was used to measure the diffraction efficiency (DE) of media. The beam of an He—Ne laser (emission wavelength 633 nm) was transformed via the spatial filter (SF) and together with the collimation lens (CL) into a parallel homogeneous beam. The final cross sections of the signal and reference beam are fixed via the iris diaphragms (1). The diameter of the iris diaphragm opening is 0.4 cm. The polarization-dependent beam splitters (PBS) split the laser beam into two coherent identically polarized beams. Via the $\lambda/2$ plates, the power of the reference beam was adjusted to 0.5 mW and the power of the signal beam to 0.65 mW. The powers were determined using the semiconductor detectors (D) with sample removed. The angle of incidence ($\alpha_0$) of the reference beam is $-21.8°$ and the angle of incidence ($\beta_0$) of the signal beam is $41.8°$. The angles are measured from the sample normal to the beam direction. According to FIG. 1, therefore, $\alpha_0$ has a negative sign and $\beta_0$ has a positive sign. At the location of the sample (medium), the interference field of the two overlapping beams produced a grating of light and dark strips which are perpendicular to the angle bisector of the two beams incident on the sample (reflection hologram). The strip spacing $\Lambda$, also referred to as grating period, in the medium is ~225 nm (the refractive index of the medium is assumed to be ~1.504).

FIG. 1 shows the geometry of a holographic media tester (HMT) at $\lambda$=633 nm (He—Ne laser): M=mirror, S=shutter, SF=spatial filter, CL=collimator lens, $\lambda/2$=$\lambda/2$ plate, PBS=polarization-sensitive beam splitter, D=detector, I=iris diaphragm, $\alpha_0$=$-21.8°$, $\beta_0$=$41.8°$ are the angles of incidence of the coherent beams measured outside the sample (outside the medium). RD=reference direction of turntable.

Holograms were written into the medium in the following manner:

Both shutters (S) are open for the exposure time t.

Thereafter, with the shutters (S) closed, the medium was allowed 5 minutes for the diffusion of still unpolymerized writing monomers.

The written holograms were then read in the following manner. The shutter of the signal beam remained closed. The shutter of the reference beam was open. The iris diaphragm of the reference beam was closed to a diameter of <1 mm. This ensured that the beam was always completely in the previously written hologram for all angles ($\Omega$) of rotation of the medium. The turntable, under computer control, then covered the angle range from $\Omega_{min}$ to $\Omega_{max}$ with an angle step width of 0.05°. $\Omega$ is measured from the sample normal to the reference direction of the turntable. The reference direction of the turntable occurs when, during writing of the hologram, the angle of incidence of the reference beam and of the signal beam are of equal magnitude, i.e. $\alpha_0$=$-31.8°$ and $\beta_0$=$31.8°$. $\Omega_{recording}$ is then =0°. For $\alpha_0$=$-21.8°$ and $\beta_0$=$41.8°$, therefore, $\Omega_{recording}$ is 10°. The following is generally true for the interference field during recording ("writing") of the hologram:

$$\alpha_0 = \theta_0 + \Omega_{recording}.$$

$\theta_0$ is the semiangle in the laboratory system outside the medium and the following is true during recording of the hologram:

$$\theta_0 = \frac{\alpha_0 - \beta_0}{2}.$$

In this case, $\theta_0$ is therefore $-31.8°$. At each angle $\Omega$ of rotation approached, the powers of the beam transmitted in the zeroth order were measured by means of the corresponding detector D and the powers of the beam diffracted in the first order were measured by means of detector D. The diffraction efficiency was obtained at each angle $\Omega$ approached as the quotient of:

$$\eta = \frac{P_D}{P_D + P_T}$$

$P_D$ is the power in the detector of the diffracted beam and $P_T$ is the power in the detector of the transmitted beam.

By means of the method described above, the Bragg curve (it describes the diffraction efficiency $\eta$ as a function of the angle $\Omega$ of rotation) of the recorded hologram was measured and stored in a computer. In addition, the intensity transmitted in the zeroth order was also recorded with respect to the angle $\Omega$ of rotation and stored in a computer.

The maximum diffraction efficiency (DE=$\eta_{max}$) of the hologram, i.e. its peak value, was determined at $\Omega_{reconstruction}$. For this purpose, the position of the detector of the diffracted beam had to be changed, if necessary, in order to determine this maximum value.

The refractive index contrast $\Delta n$ and the thickness d of the photopolymer layer were now determined by means of the Coupled Wave Theory (cf. H. Kogelnik, The Bell System Technical Journal, Volume 48, November 1969, Number 9, page 2909-page 2947) from the measured Bragg curve and the angle variation of the transmitted intensity. It should be noted that, owing to the thickness shrinkage occurring as a result of the photopolymerization, the strip spacing $\Lambda'$ of the hologram and the orientation of the strips (slant) may deviate from the strip spacing $\Lambda$ of the interference pattern and the orientation thereof. Accordingly, the angle $\alpha_0'$ or the corresponding angle of the turntable $\Omega_{construction}$ at which maximum diffraction efficiency is achieved will also deviate from $\alpha_0$ or from the corresponding $\Omega_{recording}$, respectively. As a result, the Bragg condition changes. This change is taken into account in the evaluation method. The evaluation method is described below:

all geometrical quantities which relate to the recorded hologram and not to the interference pattern are represented as quantities shown by dashed lines.

According to Kogelnik, the following is true for the Bragg curve $\eta(\Omega)$ of a reflection hologram:

$$\eta = \begin{cases} \dfrac{1}{1 - \dfrac{1 - (\xi/\nu)^2}{\sin^2\left(\sqrt{\xi^2 - \nu^2}\right)}}, & \text{for } \nu^2 - \xi^2 < 0 \\[2ex] \dfrac{1}{1 + \dfrac{1 - (\xi/\nu)^2}{\sinh^2\left(\sqrt{\nu^2 - \xi^2}\right)}}, & \text{for } \nu^2 - \xi^2 \geq 0 \end{cases}$$

-continued with:

$$v = \frac{\pi \cdot \Delta n \cdot d'}{\lambda \cdot \sqrt{|c_s \cdot c_r|}}$$

$$\xi = -\frac{d'}{2 \cdot c_s} \cdot DP$$

$$c_s = \cos(\vartheta') - \cos(\psi') \cdot \frac{\lambda}{n \cdot \Lambda'}$$

$$c_r = \cos(\vartheta')$$

$$DP = \frac{\pi}{\Lambda'} \cdot \left(2 \cdot \cos(\psi' - \vartheta') - \frac{\lambda}{n \cdot \Lambda'}\right)$$

$$\psi' = \frac{\beta' + \alpha'}{2}$$

$$\Lambda' = \frac{\lambda}{2 \cdot n \cdot \cos(\psi' - \alpha')}$$

When reading the hologram ("reconstruction"), the situation is analogous to that described above:

$$\vartheta'_0 = \vartheta_0 + \Omega$$

$$\sin(\vartheta'\zeta_0) = n \cdot \sin(\vartheta')$$

Under the Bragg condition, the "dephasing" DP is 0. Accordingly, the following is true:

$$\alpha'_0 = \vartheta_0 + \Omega_{reconstruction}$$

$$\sin(\alpha'_0) = n \cdot \sin(\alpha')$$

The still unknown angle β' can be determined from the comparison of the Bragg condition of the interference field during recording of the hologram and the Bragg condition during reading of the hologram, assuming that only thickness shrinkage takes place. The following is then true:

$$\sin(\beta') = \frac{1}{n} \cdot [\sin(\alpha_0) + \sin(\beta_0) - \sin(\vartheta_0 + \Omega_{reconstruction})]$$

$v$ is the grating thickness, $\xi$ is the detuning parameter and $\psi'$ is the orientation (slant) of the refractive index grating which was recorded. $\alpha'$ and $\beta'$ correspond to the angles $\alpha_0$ and $\beta_0$ of the interference field during recording of the hologram, but measured in the medium and applicable to the grating of the hologram (after thickness shrinkage), n is the mean refractive index of the photopolymer and was set at 1.504. $\lambda$ is the wavelength of the laser light in vacuo.

The maximum diffraction efficiency (DE=$\eta_{max}$) for $\xi=0$ is then:

$$DE = \tanh^2(v) = \tanh^2\left(\frac{\pi \cdot \Delta n \cdot d'}{\lambda \cdot \sqrt{\cos(\alpha') \cdot \cos(\alpha' - 2\psi)}}\right)$$

FIG. 1 shows the measured transmitted power $P_T$ (right y axis) as a solid line plotted against the angle detuning $\Delta\Omega$, the measured diffraction efficiency $\eta$ (left y axis) as solid circles plotted against the angle detuning $\Delta\Omega$ (if permitted by the finite size of the detector) and the adaptation of the Kogelnik theory as a dashed line (lefty axis).

Figure 2:
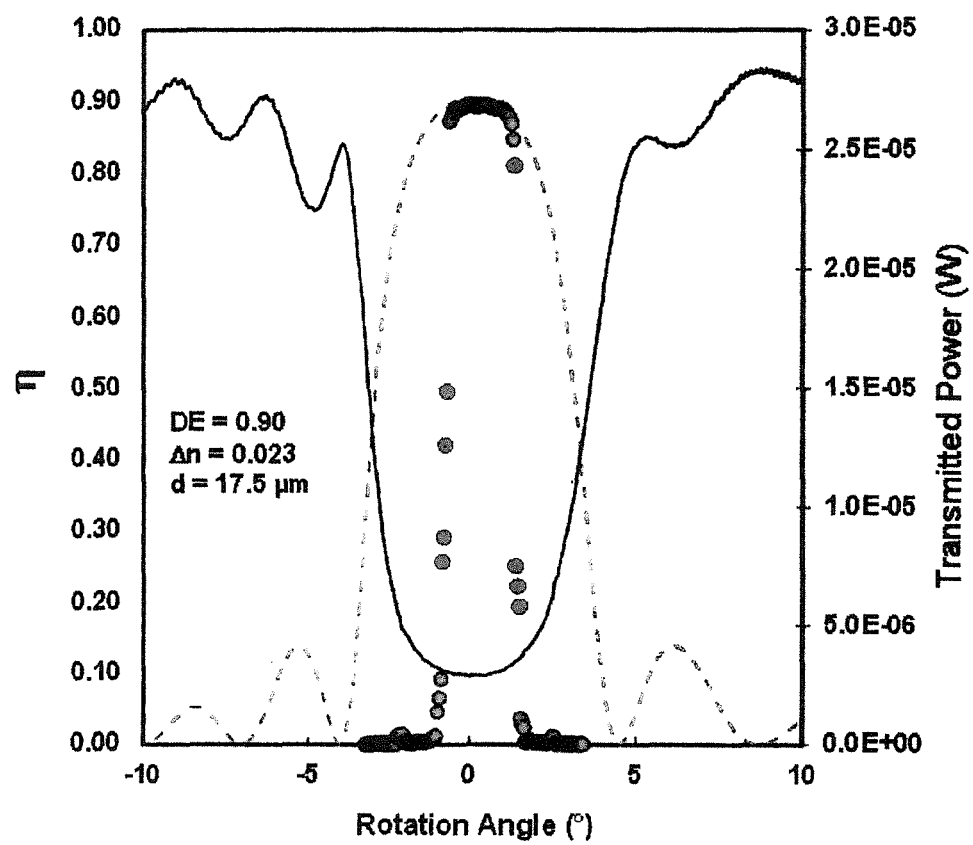
FIG. 2 shows the plot of the Bragg curve according to the Coupled Wave Theory.

The measured data of the diffraction efficiency, the theoretical Bragg curve and the transmitted intensity are plotted against the centred angle of rotation $\Delta\Omega \equiv \Omega_{reconstruction} - \alpha'_0 - \vartheta'_0$, also referred to as angle detuning, as shown in FIG. 2.

Since DE is known, the shape of the theoretical Bragg curve according to Kogelnik is determined only by the thickness d' of the photopolymer layer. $\Delta n$ is corrected via DE for a given thickness d' so that measurement and theory of DE always agree. d' is now adjusted until the angular positions of the first secondary minima of the theoretical Bragg curve correspond to the angular positions of the first secondary maxima of the transmitted intensity and furthermore the full width at half maximum (FWHM) for the theoretical Bragg curve and for the transmitted intensity correspond.

Since the direction in which a reflection hologram rotates on reconstruction by means of an $\Omega$ scan, but the detector for diffracted light can detect only a finite angular range, the Bragg curve of broad holograms (small d') is not completely registered with an $\Omega$ scan, but only the central region, with suitable detector positioning. The shape of the transmitted intensity which is complementary to the Bragg curve is therefore additionally used for adjusting the layer thickness d'.

FIG. 2 shows the plot of the Bragg curve $\eta$ according to the Coupled Wave Theory (dashed line), the measured diffraction efficiency (solid circles) and the transmitted power (black solid line) against the angle detuning $\Delta\Omega$.

For one formulation, this procedure was possibly repeated several times for different exposure times t on different media in order to determine at which mean energy dose of the incident laser beam during recording of the hologram DE the saturation value is reached. The mean energy dose E is obtained as follows from the powers of the two partial beams coordinated with the angles $\alpha_0$ and $\beta_0$ (reference beam with $P_r$=0.50 mW and signal beam with $P_s$=0.63 mW), the exposure time t and the diameter of the iris diaphragm (0.4 cm):

$$E(mJ/cm^2) = \frac{2 \cdot [P_r + P_s] \cdot t(s)}{\pi \cdot 0.4^2 \text{ cm}^2}$$

The powers of the partial beams were adjusted so that, at the angles $\alpha_0$ and $\beta_0$ used, the same power density is reached in the medium.

Substances:

The reagents and solvents used were acquired commercially,

CGI-909 Tetrabutylammonium tris(3-chloro-4-methylphenyl)(hexyl)borate, [1147315-11-4] is a product produced by BASF SE, Basle, Switzerland.

Desmorapid Z Dibutyltin dilaurate [77-58-7], product from Bayer MaterialScience AG, Leverkusen, Germany.

Desmodur® N 3900 Product from Bayer MaterialScience AG, Leverkusen, Germany, hexane diisocyanate-based polyisocyanate, iminooxadiazinedione proportion at least 30%, NCO content: 23.5%.

Fomrez UL 28 Urethanization catalyst, commercial product of Momentive Performance Chemicals, Wilton, Conn., USA.

Preparation of Dyes

Example 1

Preparation of 4-nitro-1,3-diphenylbutan-1-one

In a 1 L flask, 94.7 g (0.455 mol) of benzylideneacetophenone were dissolved in 600 g of methanol, admixed with 138.9 g (2.275 mol) of nitromethane and 166.4 g (2.275 mol) of diethylamine and refluxed for 16 h. The solvent was half distilled off in vacuo and the precipitated solid was separated off and dried to constant weight in vacuo to obtain 118 g (438 mmol) of 4-nitro-1,3-diphenylbutan-1-one.

Example 2

Preparation of N-[(2Z)-3,5-diphenyl-2H-pyrrol-2-ylidene]-3,5-diphenyl-1H-pyrrol-2-amine

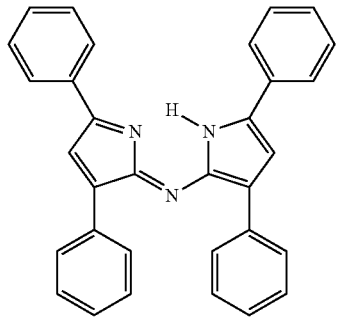 [SMILES: C1=C(c2ccccc2)/C(=N/c2[nH]c(-c3ccccc3)cc2-c2ccccc2)N=C1c1ccccc1]

In a 2 L flask, 113.4 g (79 mmol) of 4-nitro-1,3-diphenylbutan-1-one were dissolved in 900 g of ethanol, admixed with 486 g (6.31 mol) of ammonium acetate and refluxed for 24 h. The reaction mixture was cooled down and the solvent was distilled off in vacuo. The residue was stirred up with 400 g of water and 200 g of ethanol, and the precipitate was separated off and dried in vacuo to obtain 46 g (102 mmol) of N-[(2Z)-3,5-diphenyl-2H-pyrrol-2-ylidene]-3,5-diphenyl-1H-pyrrol-2-amine.

UV-VIS spectrum: $\lambda_{max}$: 592 nm, $\epsilon_0$: 54900 L·mol$^{-1}$·cm$^{-1}$

Example 3

Preparation of (2E)-1-(4-bromophenyl)-3-phenyl-prop-2-en-1-one

In a 500 mL flask, 99.4 g (0.50 mol) of 4-bromoacetophenone and 53.0 g (0.5 mol) of benzaldehyde were initially charged and dissolved in 50 g of methanol. The mixture was admixed with 6.7 g (0.025 mol) of 15% strength aqueous sodium hydroxide solution carefully added dropwise at 20-25° C. and subsequently stirred for 3 h. The reaction mixture was neutralized with glacial acetic acid and filtered and the solid was dried in vacuo to obtain 107 g (351 mmol) of (2E)-1-(4-bromophenyl)-3-phenylprop-2-en-1-one.

Example 4

Preparation of 1-(4-bromophenyl)-4-nitro-3-phenylbutan-1-one

In a 1 L flask, 46.9 g (154 mmol) of (2E)-1-(4-bromophenyl)-3-phenylprop-2-en-1-one were dissolved in 450 g of methanol, admixed with 46.9 g (768 mmol) of nitromethane and 56.2 g (768 mmol) of diethylamine and refluxed for 16 h. The solvent was half distilled off in vacuo and the precipitated solid was separated off and dried to constant weight in vacuo to obtain 46 g (132 mmol) of 1-(4-bromophenyl)-4-nitro-3-phenylbutan-1-one.

Example 5

Preparation of 5-(4-bromophenyl)-N-[(2Z)-5-(4-bromophenyl)-3-phenyl-2H-pyrrol-2-ylidene]-3-phenyl-1H-pyrrol-2-amine In a 1 L flask, 27.8 g (79 mmol) of 1-(4-bromophenyl)-4-nitro-3-phenylbutan-1-one were dissolved in 750 g of ethanol, admixed with 223 g (2.89 mol) of ammonium acetate and refluxed for 42 h. The reaction mixture was cooled down, and the resulting precipitate was separated off and washed with cold ethanol and n-pentane to obtain 12 g (20 mmol) of 5-(4-bromophenyl)-N-[(2Z)-5-(4-bromophenyl)-3-phenyl-2H-pyrrol-2-ylidene]-3-phenyl-1H-pyrrol-2-amine.

Example 6

Preparation of (2E)-1-(4-fluorophenyl)-3-phenyl-prop-2-en-1-one

In a 500 mL flask, 110.7 g (0.80 mol) of 4-fluoroacetophenone and 84.9 g (0.80 mol) of benzaldehyde were initially charged and dissolved in 65 g of methanol. The mixture was admixed with 10.7 g (0.04 mol) of 15% strength aqueous sodium hydroxide solution carefully added dropwise at 20-25° C. and then stirred for 3 h. The reaction mixture was neutralized with glacial acetic acid and filtered, and the solid was dried in vacuo to obtain 146 g (644 mmol) of (2E)-1-(4-bromophenyl)-3-phenylprop-2-en-1-one.

Example 7

Preparation of 1-(4-fluorophenyl)-4-nitro-3-phenylbutan-1-one

In a 1 L flask, 138.8 g (613 mmol) of (2E)-1-(4-fluorophenyl)-3-phenylprop-2-en-1-one were dissolved in 825 g of methanol, admixed with 187.0 g (3.06 mol) of nitromethane and 224.1 g (3.06 mol) of diethylamine and refluxed for 16 h. The solvent was half distilled off in vacuo and the precipitated solid was separated off and dried to constant weight in vacuo to obtain 167.7 g (583 mmol) of 1-(4-fluorophenyl)-4-nitro-3-phenylbutan-1-one.

Example 8

Preparation of 5-(4-fluorophenyl)-N-[(2Z)-5-(4-fluorophenyl)-3-phenyl-2H-pyrrol-2-ylidene]-3-phenyl-1-pyrrol-2-amine

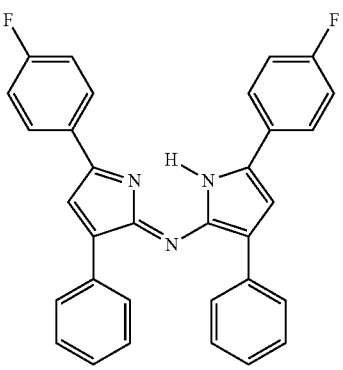 [SMILES: Fc1ccc(C2=N/C(=N\c3[nH]c(-c4ccc(F)cc4)cc3-c3ccccc3)C(c3ccccc3)=C2)cc1]

In a 2 L flask, 129.4 g (450 mmol) of 1-(4-fluorophenyl)-4-nitro-3-phenylbutan-1-one were dissolved in 975 g of ethanol, admixed with 520 g (6.75 mol) of ammonium acetate and refluxed for 3 h. The reaction mixture was cooled down and the solvent was distilled off in vacuo. The residue was stirred up with 400 g of water and 200 g of ethanol and the precipitate was separated off and dried in vacuo to obtain 49.6 g (102 mmol) of 5-(4-fluorophenyl)-N-[(2Z)-5-(4-fluorophenyl)-3-phenyl-2H-pyrrol-2-ylidene]-3-phenyl-1H-pyrrol-2-amine.
UV-VIS spectrum: $\lambda_{max}$: 590 nm, $\epsilon_0$: 38100 L·mol$^{-1}$·cm$^{-1}$

Example 9

Preparation of (4-phenyl-1,3-thiazol-2-yl)malononitrile

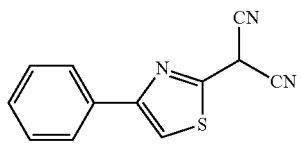 [SMILES: N#CC(C#N)c1nc(-c2ccccc2)cs1]

In a 100 mL three-neck flask, 10.0 g (56.4 mmol) of 2-oxo-2-phenylethyl thiocyanate and 3.73 g (56.4 mmol) of malononitrile were dissolved in 60 mL of ethanol and admixed with 5.14. g (50.8 mmol) of triethylamine in a gradual manner, so the temperature did not climb above 30° C. This was followed by stirring at room temperature for 12 h. The reaction mixture was diluted with 50 mL of water and acidified with glacial acetic acid. The precipitated solid was separated off and washed three times with 10 mL of a 10:10:1 mixture of water:ethanol:glacial acetic acid each time. The solid was dried to obtain 11.1 g (49.1 mmol) of (4-phenyl-1,3-thiazol-2-yl)malononitrile.

Example 10

Preparation of [N-(3,5-diphenyl-2H-pyrrol-2-ylidene-kappaN)-3,5-diphenyl-1H-pyrrol-2-aminato-kappaN$^1$](difluoro)boron (dye of formula (I-a))

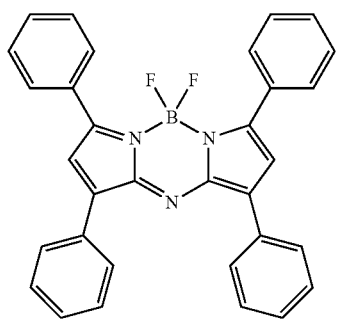

(I-a)

In a 250 mL flask, 1.69 g (3.8 mmol) of the N-[(2Z)-3,5-diphenyl-2H-pyrrol-2-ylidene]-3,5-diphenyl-1H-pyrrol-2-amine from Example 2 and 1.76 g (2.28 mmol) of diisopropylethylamine were dissolved in 7.5 g of dichloromethane. The mixture was admixed with 4.05 g (28.5 mmol) of boron trifluoride diethyl etherate carefully added dropwise at 20-25° C. and then stirred for 24 h. The reaction mixture was admixed with a further 100 mL of dichloromethane and poured onto 100 g of ice-water. The aqueous phase was extracted with 100 mL of dichloromethane three times and filtered and the combined organic phases were washed with 200 mL of water and dried with Na$_2$SO$_4$. The solvent was distilled off in vacuo to obtain 1.6 g (3.2 mmol) of the dye of formula (I-a).
UV-VIS spectrum: $\lambda_{max}$: 634 nm, $\epsilon_0$: 93200 L·mol$^{-1}$·cm$^{-1}$

Example 11

Preparation of difluoro{5-(4-fluorophenyl)-N-[5-(4-fluorophenyl)-3-phenyl-2H-pyrrol-2-ylidene-kappaN]-3-phenyl-1H-pyrrol-2-aminato-kappaN$^1$}boron (dye of formula (I-b))

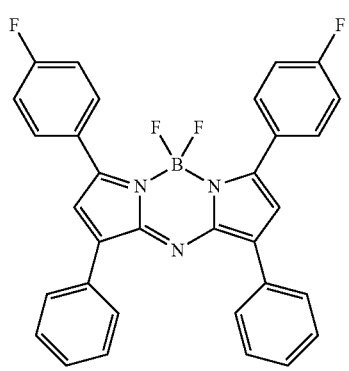

(I-b)

In a 1 L flask, 35.9 g (74.0 mmol) of 5-(4-fluorophenyl)N-[(2Z)-5-(4-fluorophenyl)-3-phenyl-2H-pyrrol-2-ylidene]-3-phenyl-1H-pyrrol-2-amine from Example 8 and 34.6 g (448 mmol) of diisopropylethylamine were dissolved in 850 g of dichloromethane. The mixture was admixed with 79.5 g (560 mmol) of boron trifluoride diethyl etherate carefully added dropwise at 20-25° C. and then stirred for 48 h. The precipitated solid was separated off, washed twice with 200 mL of water each time and dried to obtain 25.5 g (47.7 mmol) of the dye of formula (I-b).
UV-VIS spectrum: $\lambda_{max}$: 631 nm, $\epsilon_0$: 66500 L·mol$^{-1}$·cm$^{-1}$

Example 12

Preparation of {5-(4-bromophenyl)-N-[5-(4-bromophenyl)-3-phenyl-2H-pyrrol-2-ylidene-kappaN]-3-phenyl-1H-pyrrol-2-aminato-kappaN}(difluoro)boron (dye of formula (I-c))

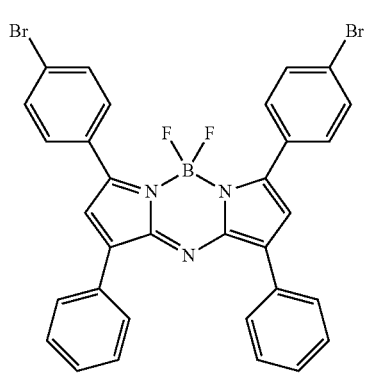

(I-c)

In a 250 mL flask, 3.07 g (5.06 mmol) of 5-(4-bromophenyl)-N-[(2Z)-5-(4-bromophenyl)-3-phenyl-2H-pyrrol-2-ylidene]-3-phenyl-1H-pyrrol-2-amine from Example 5 and 13.0 g (168 mmol) of diisopropylethylamine were dissolved in 150 g of dichloromethane. The mixture was admixed with 33.9 g (239 mmol) of boron trifluoride diethyl etherate carefully added dropwise at 20-25° C. and then stirred for 24 h. The reaction mixture was admixed with a further 100 mL of dichloromethane and poured onto 300 g of ice-water. The aqueous phase was extracted three times with 100 mL of dichloromethane and filtered and the combined organic phases were washed with 200 mL of water and dried with $Na_2SO_4$. The solvent was distilled off in vacuo to obtain 2.4 g of the dye of formula (I-c).

UV-VIS spectrum: $\lambda_{max}$: 653 nm, $\epsilon_0$: 85000 L·mol$^{-1}$·cm$^{-1}$ Comparative Example 1

Methyl(2Z)-2-{(2E)-2-[2-(dicyanomethylene)-4-phenyl-1,3-thiazol-5(2H)-ylidene]ethylidene}-1,3,3-trimethylindoline-5-carboxylate

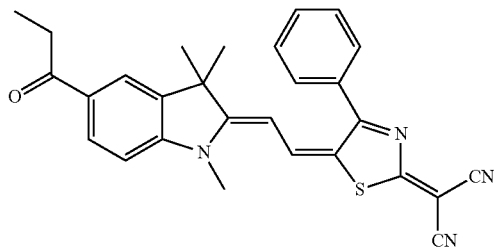 [SMILES: CCC(=O)c1ccc2c(c1)C(C)(C)/C(=C/C=c1/sc(=C(C#N)C#N)nc1-c1ccccc1)N2C]

In a 25 mL flask, 0.700 g (3.11 mmol) of (4-phenyl-1,3-thiazol-2-yl)malononitrile from Example 9 and 0.806 g (3.11 mmol) of carboxmethyl Fischer base aldehyde (prepared as described by A. Tolmachev, E. S. Kozlov, Yu. L. Slomonskii, Zh. Obshch. Khim. 1989, 59, 939 (english-language translation p. 827)) were dissolved in 5 mL of acetic anhydride and heated to 90° C. for 3 h. The reaction mixture was poured onto 50 mL of ice, the mixture was stirred with a little methanol and the precipitated solid was separated off. The solid was washed with 30 mL of water and 20 mL of methanol and dried in vacuo to obtain 1.14 g (2.44 mmol) of methyl(2Z)-2-(2E)-2-[2-(dicyanomethylene)-4-phenyl-1,3-thiazol-5(2H)-ylidene]ethylidene L-1,3,3-trimethylindoline-5-carboxylate.

UV-VIS spectrum: $\lambda_{max}$: 636 nm, $\epsilon_0$: 105100 L·mol$^{-1}$·cm$^{-1}$ Table 1 summarizes the water imbitions W observed for selected examples of the invention and for the comparative example.

TABLE 1

Water imbition of selected dyes

| Example | W [%] |
|---|---|
| 2 | 1.4 |
| 8 | 0.7 |
| 10 | 1.7 |
| 11 | 1.9 |
| 12 | 1.7 |
| Comparative Example 1 | 2.0 |

Example 14

Preparation of Media to Determine the Holographic Properties a) Preparation of Further Components for the Photopolymer Formulation Preparation of Polyol 1

A 1 L flask was initially charged with 0.18 g of tin octoate, 374.8 g of e-caprolactone and 374.8 g of a difunctional polytetrahydrofuran polyetherpolyol (equivalent weight 500 g/mol OH) before heating to 120° C. and maintaining this temperature until the solids content (fraction of nonvolatiles) was 99.5 wt % or higher. This was followed by cooling to obtain the product as a waxy solid.

Preparation of Urethane Acrylate 1 (Writing Monomer): phosphorothioyltris(oxybenzene-4,1-diylcarbamoyloxyethane-2,1-diyl)trisacrylate In a 500 mL round-bottom flask, 0.1 g of 2,6-di-tert-butyl-4-methylphenol, 0.05 g of dibutyltin dilaurate (Desmorapid Z, Bayer MaterialScience AG, Leverkusen, Germany) and also 213.07 g of a 27% solution of tris(p-isocyanatophenyl) thiophosphate in ethyl acetate (Desmodur® RFE, product from Bayer MaterialScience AG, Leverkusen, Germany) were initially charged and heated to 60° C. Thereafter, 42.37 g of 2-hydroxyethyl acrylate were added dropwise and the mixture was further maintained at 60° C. until the isocyanate content had dropped below 0.1%. This was followed by cooling and complete removal of the ethyl acetate under reduced pressure to obtain the product as a partly crystalline solid.

Preparation of Urethane Acrylate 2 (Writing Monomer): 2-({[methylsulphanyl)phenyl]-carbamoyl}oxy) ethyl prop-2-enoate In a 100 mL round-bottom flask, 0.02 g of 2,6-di-tert-butyl-4-methylphenol, 0.01 g of Desmorapid Z, 11.7 g of 3-(methylthio)phenyl isocyanate were initially charged and heated to 60° C. Thereafter, 8.2 g of 2-hydroxyethyl acrylate were added dropwise and the mixture was further maintained at 60° C. until the isocyanate content had dropped below 0.1%. This was followed by cooling to obtain the product as a colourless liquid.

Preparation of Additive 1 (Contrast Agent): bis(2,2,3,3,4,4,5,5,6,6,7,7-dodecafluoroheptyl)-(2,2,4-trimethylhexane-1,6-diyl)biscarbamate In a 50 mL round-bottom flask, 0.02 g of Desmorapid Z and 3.6 g of 2,4,4-trimethylhexanes 1,6-diisocyanate (TMDI) were initially charged and heated to 60° C. This was followed by the dropwise addition of 11.9 g of 2,2,3,3,4,4,5,5,6,6,7,7-dodecafluoroheptan-1-ol and the mixture was further maintained at 60° C. until the isocyanate content had dropped below 0.1%. This was followed by cooling to obtain the product as a colourless oil.

b) Preparation of Media to Determine the Holographic Properties

Example Medium I 3.38 g of polyol component 1 were mixed with 2.00 g of urethane acrylate 1, 2.00 g of urethane acrylate 2, 1.50 g of additive 1, 0.10 g of CGI 909 (product from BASF SE, Basle, Switzerland), 0.010 g of dye from Example 10 and 0.35 g of N-ethylpyrrolidone at 60° C. to obtain a clear solution. The solution was then cooled down to 30° C., 0.65 g of Desmodur® N3900 (commercial product from Bayer MaterialScience AG, Leverkusen, Germany, hexane diisocyanate-based polyisocyanate, portion on iminooxadiazinedione at least 30%, NCO content: 23.5%) was added before renewed mixing. Finally, 0.01 g of Fomrez UL 28 (urethanization catalyst, commercial product of Momentive Performance Chemicals, Wilton, Conn., USA) was added and again briefly mixed in. The liquid mass obtained was then applied to a glass plate and covered thereon with a second glass plate. This sample specimen was left to lie at room temperature for 12 hours for curing.

Example Medium II

Example Medium I was repeated except that 0.010 g of dye from Example 11 was used instead of 0.010 g of dye from Example 10.

Example Medium III

Example Medium I was repeated except that 0.010 g of dye from Example 12 was used instead of 0.010 g of dye from Example 10.

Example Medium IV 3.68 g of polyol component 1 were mixed with 2.00 g of urethane acrylate 1, 2.00 g of urethane acrylate 2, 1.50 g of additive 1, 0.10 g of CGI 909 (product from BASF SE, Basle, Switzerland), 0.010 g of dye from Example 11 at 60° C. to obtain a clear solution. The solution was then cooled down to 30° C., 0.70 g of Desmodur®N3900 (commercial product from Bayer MaterialScience AG, Leverkusen, Germany, hexane diisocyanate-based polyisocyanate, portion on iminooxadiazinedione at least 30%, NCO content: 23.5%) was added before renewed mixing. Finally, 0.01 g of Fomrez UL 28 (urethanization catalyst, commercial product of Momentive Performance Chemicals, Wilton, Conn., USA) was added and again briefly mixed in. The liquid mass obtained was then applied to a glass plate and covered thereon with a second glass plate. This sample specimen was left to lie at room temperature for 12 hours for curing.

Example Medium V

Example Medium I was repeated except that 0.010 g of dye from Example 12 was used instead of 0.010 g of dye from Example 10.

Comparative Medium I 3.38 g of polyol component 1 were mixed with 2.00 g of urethane acrylate 1, 2.00 g of urethane acrylate 2, 1.50 g of additive 1, 0.10 g of CGI 909 (product from BASF SE, Basle, Switzerland), 0.012 g of dye from Comparative Example 1 and 0.35 g of N-ethylpyrrolidone at 60° C. to obtain a clear solution. The solution was then cooled down to 30° C., 0.65 g of Desmodur® N3900 (commercial product from Bayer MaterialScience AG, Leverkusen, Germany, hexane diisocyanate-based polyisocyanate, portion on iminooxadiazinedione at least 30%, NCO content: 23.5%) was added before renewed mixing. Finally, 0.01 g of Fomrez UL 28 (urethanization catalyst, commercial product of Momentive Performance Chemicals, Wilton, Conn., USA) was added and again briefly mixed in. The liquid mass obtained was then applied to a glass plate and covered thereon with a second glass plate. This sample specimen was left to lie at room temperature for 12 hours for curing.

Comparative Medium II 3.38 g of polyol component 1 were mixed with 2.00 g of urethane acrylate 1, 2.00 g of urethane acrylate 2, 1.50 g of additive 1, 0.10 g of CGI 909 (product from BASF SE, Basle, Switzerland), 0.010 g of dye from Example 2 and 0.35 g of N-ethylpyrrolidone at 60° C. to obtain a clear solution. The solution was then cooled down to 30° C., 0.65 g of Desmodur® N3900 (commercial product from Bayer MaterialScience AG, Leverkusen, Germany, hexane diisocyanate-based polyisocyanate, portion on iminooxadiazinedione at least 30%, NCO content: 23.5%) was added before renewed mixing. Finally, 0.01 g of Fomrez UL 28 (urethanization catalyst, commercial product of Momentive Performance Chemicals, Wilton, Conn., USA) was added and again briefly mixed in. The liquid mass obtained was then applied to a glass plate and covered thereon with a second glass plate. This sample specimen was left to lie at room temperature for 12 hours for curing.

Comparative Medium III 3.38 g of polyol component 1 were mixed with 2.00 g of urethane acrylate 1, 2.00 g of urethane acrylate 2, 1.50 g of additive 1, 0.10 g of CGI 909 (product from BASF SE, Basle, Switzerland), 0.010 g of dye from Example 8 and 0.35 g of N-ethylpyrrolidone at 60° C. to obtain a clear solution. The solution was then cooled down to 30° C., 0.65 g of Desmodure N3900 (commercial product from Bayer MaterialScience AG, Leverkusen, Germany, hexane diisocyanate-based polyisocyanate, portion on iminooxadiazinedione at least 30%, NCO content: 23.5%) was added before renewed mixing. Finally, 0.01 g of Fomrez UL 28 (urethanization catalyst, commercial product of Momentive Performance Chemicals, Wilton, Conn., USA) was added and again briefly mixed in. The liquid mass obtained was then applied to a glass plate and covered thereon with a second glass plate. This sample specimen was left to lie at room temperature for 12 hours for curing.

Holographic Testing:

The media obtained as described were subsequently tested for their holographic properties in the manner described above using a measuring arrangement as per FIG. 1. The following measurements were obtained for $\Delta n_{sat}$ at dose E [mJ/cm$^2$]:

TABLE 2

Holographic assessment of selected examples

| Dye from Example | Example Medium | $\Delta n_{sat}$ | Dose [mJ/cm$^2$] |
|---|---|---|---|
| 10 | Example Medium I | 0.024 | 145 |
| 11 | Example Medium II | 0.029 | 64 |
| 12 | Example Medium III | 0.026 | 36 |
| 11 | Example Medium IV | 0.024 | 36 |
| 12 | Example Medium V | 0.029 | 36 |
| Comparative Example 1 | Comparative Medium I | No hologram | |
| 2 | Comparative Medium II | No hologram | |
| 8 | Comparative Medium III | No hologram | |

The values found for Example Media I to V show that the dyes of formula (I) according to the invention which are used in the photopolymer formulations are very suitable for use in holographic media owing to the high value of $\Delta n_{sat}$. The results for Example Media IV and V show that omitting the co-solvent N-ethylpyrrolidone does not result in any observable worsening in the values of $\Delta n_{sat}$ compared with Example Media I to III. The neutral dye from Comparative Example 1 used in Comparative Medium I, by contrast, is not suitable for writing holograms. Comparative Media II and III also show that the dyes only develop adequate activity in holographic media in the presence of the bridging ligand E, i.e. the presence of a radical derived from the element selected from boron, aluminium, gallium, indium, scandium and yttrium, as illustrated by way of example by the presence of the boron-derived bridging ligand. Without these specific bridging ligands, holograms could not be produced with the dyes used owing to the lack of activity.

The invention claimed is:

1. A photopolymer formulation comprising a polyol component, a polyisocyanate component, a writing monomer and a photoinitiator, wherein the photoinitiator contains a dye of general formula (I),

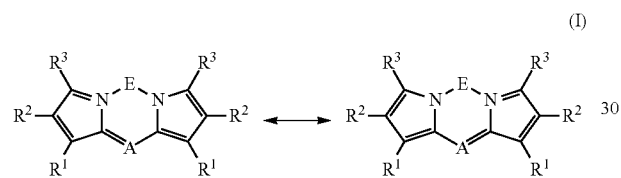

wherein
A represents N,
E represents boron, and substituted with two halogen radicals or with one radical selected from oxygen and sulphur, and
$R^1$ and $R^3$ each independently represent an optionally substituted aromatic radical, and
$R^2$ represent hydrogen, halogen, cyano, nitro, optionally fluorinated alkoxy or an optionally substituted aromatic, aliphatic or araliphatic radical.

2. The photopolymer formulation according to claim 1, wherein the dye has a water imbibition of ≤5%.

3. The photopolymer formulation according to claim 2, wherein the dye has a water inhibition of ≤3%.

4. The photopolymer formulation according to claim 3, wherein the dye has a water inhibition of ≤2%.

5. The photopolymer formulation according to claim 1, wherein $R^2$ represent hydrogen, halogen, cyano, nitro, optionally fluorinated alkoxy or an optionally halogen-substituted aromatic, aliphatic or araliphatic radical.

6. The photopolymer formulation according to claim 5 wherein $R^2$ represent hydrogen or an optionally halogen-substituted aromatic radical.

7. The photopolymer formulation according to claim 1, wherein the polyisocyanate component is an aliphatic and/or cycloaliphatic polyisocyanate or a prepolymer with primary NCO groups.

8. The photopolymer formulation according to claim 1, wherein the polyol component is an at least difunctional polyether, polyester or a polyether-polyester block copolyester with primary OH functions.

9. The photopolymer formulation according to claim 1, wherein the writing monomer comprises one or more than one monofunctional and/or multifunctional urethane(meth)acrylate.

10. The photopolymer formulation according to claim 1, wherein the photoinitiator contains one or more than one coinitiator.

11. The photopolymer formulation according to claim 1, additionally comprising a plasticizer.

12. The photopolymer formulation according to claim 11, wherein the plasticizer conforms to general formula (III)

where m is ≥1 and ≤8 and $R^6$, $R^7$, $R^8$ are independently hydrogen, linear, branched, cyclic or heterocyclic unsubstituted or optionally heteroatom-substituted organic radicals.

13. The photopolymer formulation of claim 12, wherein at least one of $R^6$, $R^7$, $R^8$ is substituted with at least a fluorine atom.

14. The photopolymer according to claim 13, wherein $R^6$ is an organic radical comprising at least one fluorine atom.

15. A holographic medium containing a photopolymer formulation according to claim 1, wherein the photopolymer formulation is coated on a substrate.

16. The holographic medium according to claim 14, in the form of a film.

17. A method comprising providing a holographic medium according to claim 15 and recording an in-line, off-axis, full-aperture transfer, white light transmission, Denisyuk, off-axis reflection or edge-lit hologram, or an holographic stereogram in said holographic medium.

18. A method for producing a holographic medium comprising providing a photopolymer formulation according to claim 1.

* * * * *